W. H. SAUVAGE.
SLACK ADJUSTER.
APPLICATION FILED JAN. 25, 1916.
1,227,943.
Patented May 29, 1917.
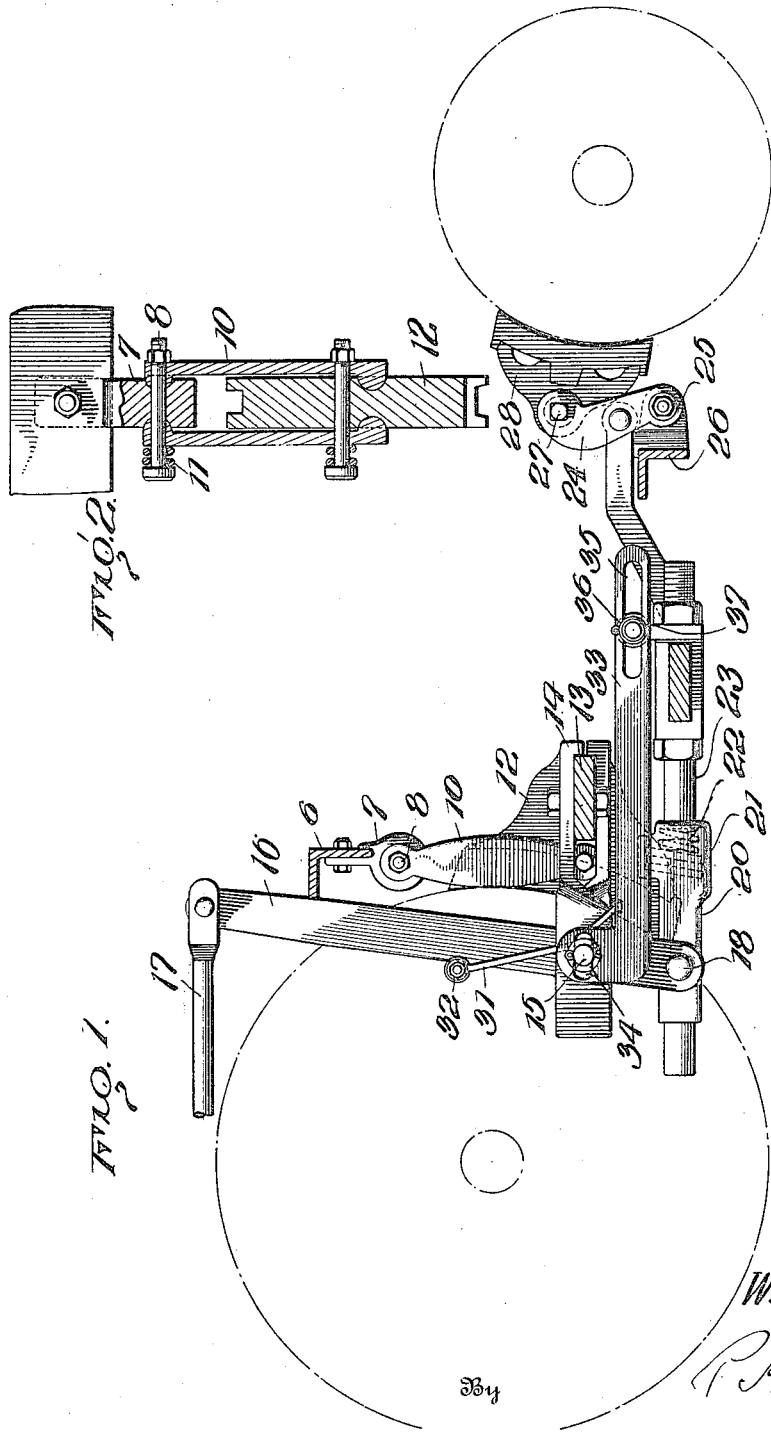
Inventor
W. H. Sauvage,
By
Attorney

UNITED STATES PATENT OFFICE.

WILLIAM H. SAUVAGE, OF FLUSHING, NEW YORK, ASSIGNOR TO GOULD COUPLER COMPANY, A CORPORATION OF NEW YORK.

SLACK-ADJUSTER.

1,227,943.

Specification of Letters Patent.

Patented May 29, 1917.

Application filed January 25, 1916. Serial No. 74,179.

*To all whom it may concern:*

Be it known that I, WILLIAM H. SAUVAGE, a citizen of the United States, and resident of Flushing, Long Island, in the county of Queens and State of New York, have invented certain new and useful Improvements in Slack-Adjusters, of which the following is a specification.

This invention relates to improvements in automatic slack adjusters for railway car brakes and more particularly to slack adjusters of the above character particularly adapted for use on that type of truck shown as maximum traction trucks.

One of the objects of the present invention is to provide a simple and practical slack adjuster of the above general character. Another object is to provide an automatic slack adjuster particularly adapted for maximum traction trucks which will be reliable and efficient in use and operation. A further object is to provide a slack adjuster of the above character having a more desirable arrangement and positioning of parts adapted to simplify the construction and cost of equipment.

Other objects will be in part obvious from the annexed drawings and in part indicated in connection therewith by the following analysis of this invention.

This invention accordingly consists in the features of construction, combination of parts and in the unique relations of the members and in the relative proportioning and disposition thereof; all as more completely outlined herein.

To enable others skilled in the art so fully to comprehend the underlying features thereof that they may embody the same by the numerous modifications in structure and relation contemplated by this invention, drawings depicting a preferred form have been annexed as a part of this disclosure, and in such drawings, like characters of reference denote corresponding parts throughout all the views, of which:—

Figure 1 is a side elevation, partly in section, showing such parts of a truck and brake rigging with the slack adjusting features applied thereto as will enable one to fully understand the invention;

Fig. 2 is a sectional detail view of a supporting mechanism;

Referring now to the drawings in detail and more particularly to Fig. 1, the wheels of the truck are indicated at 5, and as is common in maximum traction trucks one is of larger diameter than the other. A transverse support 6 associated with the truck frame or car bolster is provided with a brake rigging supporting means comprising what may be termed a half ball hanger such as shown in detail view, Fig. 2.

This mechanism comprises a casting 7 secured to the transverse member 6 and provided with a horizontal opening through which a bolt 8 is adapted to pass. The member 7 is provided with semi-spherical recesses at each side adapted to receive the coacting ends of supporting links 10 which are held in frictional engagement therewith by means of springs 11 interposed between one of the links and the head of the bolt 8. The threaded nut at the end of the bolt permits the variation of tension of the spring 11 and consequently the degree of friction with which the parts engage one another. The opposite ends of these hangers 10 are similarly constructed and coact with a brake shoe head 12 carried by brake beam 13. This brake beam is provided with a strut 14 pivotally connected at point 15 with a live lever 16 to form a fulcrum therefor. The upper end of the live lever is connected with a pull rod 17 leading to the brake actuating mechanism. The lower end of the live lever 16 is bifurcated and pivotally connected at 18 to the opposite sides of a tubular casting 20 provided with means adapted to permanently hold the excess slack in the rigging due to wear of the parts. This holding means may be of any convenient type of positively acting clutch mechanism such as a screw connection, ratchet, or positively acting dogs. It is preferred, however, to use the construction shown which comprises a plurality of rectangular dogs 21 positioned within the housing formed on the member 20 and normally occupying a canted position under the action of a spiral spring 22 coiled about a coacting preferably solid telescopic member 23 passing through correspondingly shaped openings in the dogs 21 within the housing. The opposite end of the member 23 is connected through intervening members to a dead lever 24. It will thus be seen that the two parts 20 and 23 of the telescopic push rod are held against relative shortening movement during the application of the brakes but are free to elongate on release of the brakes to take up and hold any excess slack that may occur from previous wear of the parts. This dead lever is pivotally mounted at its lower end 25 on any suitable fixed transverse support 26 forming a part of the truck and the upper end is pivotally connected at 27 to the brake shoe head 28.

Associated with the brake beam strut 14 and live lever is a return spring 31 for restoring the parts to normal position. This return spring is of a general U-shaped construction having its upper ends connected by a bolt 32 provided with a case hardened rotatable sleeve engaging the live lever 16. Its lower end passes under the strut 14 and may be similarly equipped as desired, while the parts intermediate are coiled one or more times about the pivot pin 15. It will thus be seen that there is a localized pivotal or twisting action directly exerted upon the live lever and the strut adapted to maintain a desired angular relation between these parts. This return spring primarily insures a return of the live lever to normal position against the transverse member which may be considered a stop therefor inasmuch as the upper end of the live lever always returns to substantially the same position.

Intermediate the pivot 15 and member 23 is located an adjusting rod 33 which is provided with a short lost motion slot 34 at one end to insure predetermined brake shoe clearance and a longer slot 35 at the other engaging a friction clamp or temporary take up and holding device 36 carried by the member 23. This device 36 may comprise two washers engaging opposite sides of the flat rod 33 and held in desired engagement therewith by a spring 37.

The device operates in substantially the following manner: On application of the brake power the upper end of the live lever 16 moves toward the left, the pivot pin 15 first traveling along the slot 30 in the adjusting rod to take up the normal brake shoe clearance and move the brake shoes into contact with the peripheries of the wheels in substantially the usual way for of course the power is transmitted and reacted through the intervening connection to the lower end of the live lever and the dead lever 24 to exert a corresponding action upon the brake shoe carried by the head 28 adjacent the smaller wheel. This movement of the live lever also slightly varies the angular relation between the strut 14 and the live lever and places the return spring 31 under tension. If excess travel takes place due primarily to the wear of the brake shoes, the frictional member 36 will move relatively along about the slot 35 and register the false travel and on release of the brakes as the parts return to normal position will hold the slack thus taken up until the same may be held by the permanent holding means. In other words, the brake beam strut acts as a fulcrum about which the live lever turns to pull the casing or housing 20 along the inner telescopic member 23 a corresponding distance. The dogs always being canted, will maintain the parts in this position and permanently hold the excess slack.

It is, of course, to be understood that other holding means may be substituted as previously stated in order to maintain this variance between the effective ends of the telescopic members.

It is thus seen from the above description that the invention is particularly applicable for a maximum traction brake and is adapted to accomplish, among others, all of the objects and advantages above set forth.

Without further analysis, the foregoing will so fully reveal the gist of this invention that others can by applying current knowledge readily adapt it for various applications without omitting certain feature that, from the standpoint of the prior art, fairly constitute essential characteristics of the generic or specific aspects of this invention, and therefore such adaptations should and are intended to be comprehended within the meaning and range of equivalency of the following claims.

I claim:

1. In a slack adjuster, in combination, a live lever, an actuating member connected to the upper part thereof, a dead lever pivotally supported at its lower end and carrying a brake shoe support at its upper end, an extensible rod between said levers composed of two parts pivotally connected to the live and dead levers respectively and adapted to telescope one within the other, and means coacting with the effective ends of said parts adapted to permit free movement in one direction and prevent movement in the opposite direction.

2. In a slack adjuster, in combination, a brake beam pivotally supported from a fixed part of the truck adapted to carry a brake shoe head, a live lever pivotally connected between its ends with said brake beam, a dead lever pivotally supported at its lower end on a relatively fixed part of the truck and carrying a brake shoe head at its upper end, a telescopic push rod pivotally connected near the middle of said dead lever and the lower end of the live lever, means adapted to permit relative expansion of the parts of said push rod and permanently hold the slack due to wear of the parts, and a return spring associated with said live lever and its pivotal connection with the brake beam.

3. In a slack adjuster, in combination, a brake beam pivotally suspended by a frictional hanger from a relatively fixed part of the truck, a live lever having a pivotal connection with said beam, and a return spring associated with the pivotal connection of said live lever adapted to maintain a substantially constant normal angle between said parts.

4. In a slack adjuster, in combination, a brake shoe head pivotally supported from a relatively fixed part of a truck, friction means associated with the support adapted to hold the brake shoe head in substantially the position to which it is moved, a live lever associated with said brake shoe head, having a pivot point between its end and near the brake shoe head, a dead lever, an extensible push rod between the live and dead lever adapted to permanently hold the slack due to excess travel of the parts, and a return spring associated with the pivotal connection of said live lever, said return spring being of substantially U-shaped construction.

5. In a slack adjuster, in combination, a brake beam pivotally suspended by a frictional hanger from a relatively fixed part of the truck, a brake beam strut connected therewith, and a live lever pivotally connected intermediate its ends with said strut and having its upper end connected with the brake actuating mechanism and its lower end connected to one portion of a two-part telescopic member, said member being provided with means operating between its effective ends adapted to permit free relative movement of the parts with respect to each other in one direction only.

6. In a slack adjuster, in combination, a brake beam pivotally suspended by a frictional hanger from a relatively fixed part of the truck, a brake beam strut connected therewith, a live lever pivotally connected intermediate its ends with said strut and having its upper end connected with the brake actuating mechanism and its lower end connected to one portion of a two-part telescopic member, said members being provided with means operating between their effective ends adapted to permit free relative movement of the parts with respect to each other in one direction only, and a return spring acting between said brake beam strut and live lever.

7. In a slack adjuster, in combination, a brake beam pivotally suspended by a frictional hanger from a relatively fixed part of the truck, a brake beam strut associated therewith, a live lever connected with one of the parts, a dead lever, and intervening connections between the live and dead levers adapted to be extended permanently to hold the slack due to excess travel of the brake shoe heads, said mechanism being actuated by said frictional hanger in holding said live lever in substantially the position to which it was moved by the excess travel of the parts.

8. In a slack adjuster, in combination, transverse members forming parts of the truck frame, brake shoe heads supported from said parts, live and dead levers connected with said heads, an extensible push rod between the live and dead levers, and a return spring associated with one of said levers and the connection between said lever and the brake shoe head, said push rod being connected with the lower end of one lever and the middle part of the other lever.

9. In a slack adjuster, in combination, transverse members forming parts of the truck frame, brake shoe heads supported from said parts, live and dead levers connected with said heads, an extensible push rod between the live and dead levers, and a return spring associated with one of said levers and the connection between said lever and the brake shoe head, said dead lever being pivotally supported at its lower end and attached to the brake shoe head at its upper end.

10. In a slack adjuster, in combination, a pair of transverse supporting members, brake shoe heads supported from said members, one of the supports being provided with frictional holding means adapted to hold its brake shoe head in substantially the position to which it was moved on application of the brakes, live and dead levers associated with said heads, and an extensible push rod between said live and dead levers.

11. In a slack adjuster, in combination, a pair of transverse members forming relatively fixed parts of the truck frame, brake shoe heads pivotally supported from said members, one of the pivotal supports being provided with frictional holding means adapted to hold the associated brake shoe head in substantially the position to which it was moved on application of the brakes, live and dead levers associated with said heads, and an extensible push rod between said live and dead levers, said extensible push rod being composed of two telescopic members, and means coacting with the effective ends adapted to hold the parts of the push rod in the position to which they are moved on excess travel.

12. In a slack adjuster, in combination, a pair of transverse members forming fixed parts of the truck construction, brake shoe heads pivotally supported from said members, one of the pivotal supports being provided with frictional holding means adapted to hold its brake shoe head in substantially the position to which it was moved on application of the brakes, live and dead levers associated with said heads, and an extensible push rod between said live and dead levers, said extensible push rod being composed of two telescopic members fitting one within the other, and means coacting with the effective ends of said push rod adapted to hold the parts of the push rod in the position to which they are moved on excess travel, said holding device comprising a housing on the outer of said telescopic members and spring actuated dogs within said housing normally occupying a canted position and adapted to coact with the inner of said telescopic members.

13. In a slack adjuster, in combination, a pair of transverse truck frame members, brake shoe heads supported from said members, one of the supports being provided with frictional holding means adapted to hold its brake shoe head in substantially the position to which it was moved on application of the brakes, live and dead levers associated with said heads, and an extensible push rod between said live and dead levers, one of said transverse members forming a fixed stop adapted to limit the return movement of one of said levers.

14. In a slack adjuster, in combination, a pair of transverse truck frame members, brake shoe heads supported from said members, one of the supports being provided with holding means adapted to hold its brake shoe head in substantially the position to which it was moved on application of the brakes, live and dead levers associated with said heads, an extensible push rod between said live and dead levers, and a return spring directly connected with the pivotal connection of the live lever, one of said transverse members forming a fixed stop adapted to limit the return movement of said live lever.

15. In a slack adjuster, a transverse member forming a fixed part of the truck adapted to support a brake shoe head, means adapted to hold the brake shoe head temporarily in substantially the position to which it is moved on application of the brakes, a live lever associated with said brake shoe head and having a pivotal connection therewith, actuating means connected with said live lever, said transverse member adapted to act as a stop to limit the movement of the live lever in one direction, and a spring associated with said pivotal connection of the live lever.

16. In a slack adjuster, in combination, a transverse member adapted to pivotally support a brake shoe head, means adapted to hold the brake shoe head temporarily in substantially the position to which it is moved on application of the brakes, a live lever associated with said brake shoe head, actuating means connected with said live lever, and a spring associated with said pivotal connection of the live lever, said spring being of substantially U-shaped construction and having its sides coiled about a pivot point of the live lever.

17. In a slack adjuster, in combination, a transverse member adapted to pivotally support a brake shoe head, frictional means adapted to hold the brake shoe head temporarily in substantially the position to which it is moved on application of the brakes, a live lever associated with said brake shoe head, actuating means connected with said live lever, a dead lever pivotally supported from said second transverse member, a brake shoe head associated therewith, an extensible push rod connecting the live and dead levers comprising one member telescoping within the other, means adapted to be interposed between the effective ends of said telescopic parts and controlled by said friction means to hold the same in the position to which they are moved, and a return spring associated with one of said levers adjacent its pivotal connection with its coacting brake shoe head.

18. In a slack adjuster, in combination, a transverse member adapted to pivotally support a brake shoe head, frictional means adapted to hold the brake shoe head temporarily in substantially the position to which it is moved on application of the brakes, a live lever associated with said brake shoe head, actuating means connected with said live lever, a dead lever pivotally supported from said second transverse member, a brake shoe head associated therewith, an extensible push rod connecting the live and dead levers, means adapted to be interposed between the effective ends of said push rod and controlled by said friction means to hold the same in the position to which they are moved, and a return spring associated with one of said levers.

Signed at New York in the county of New York and State of New York this 16th day of December A. D. 1915.

WILLIAM H. SAUVAGE.

Copies of this patent may be obtained for five cents each, by addressing the "Commissioner of Patents, Washington, D. C."